UNITED STATES PATENT OFFICE.

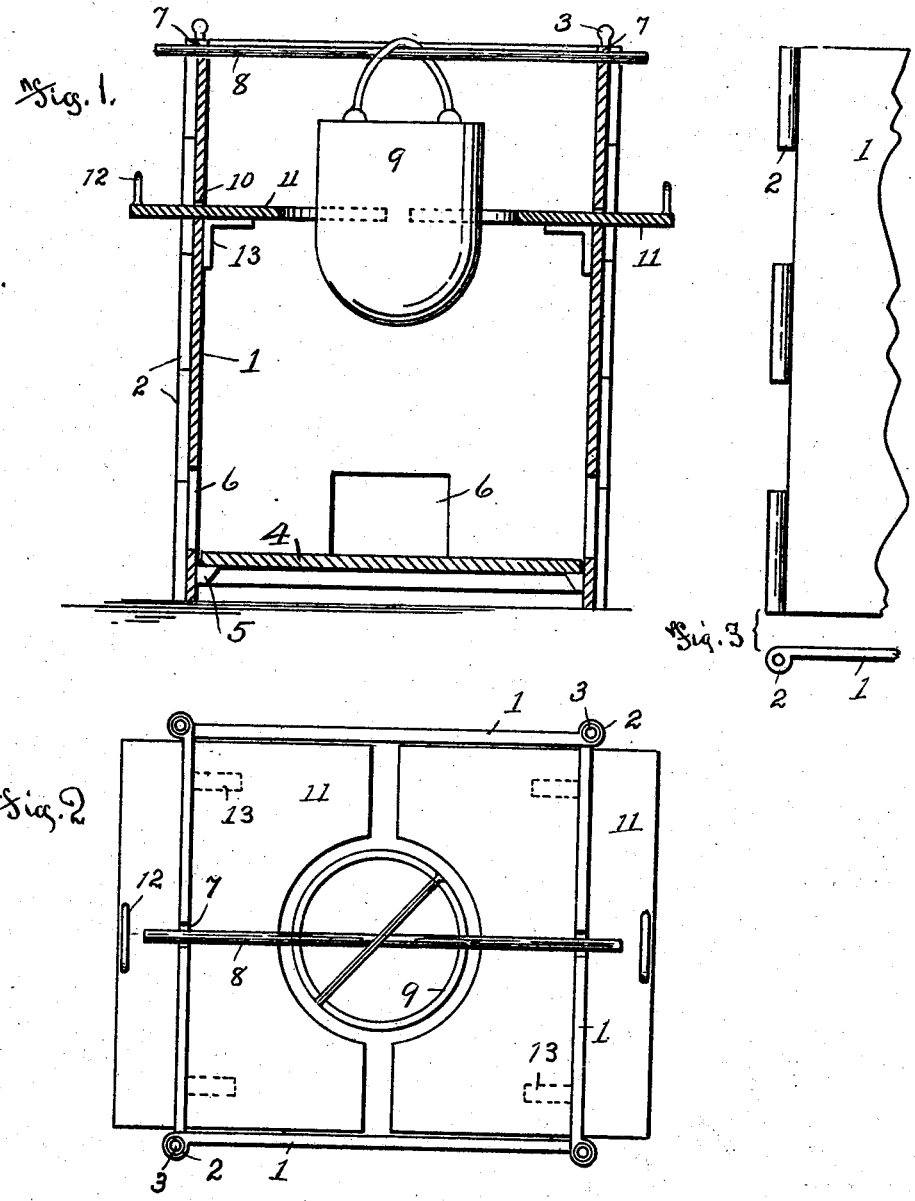

THOMAS D. BAUSHER, OF READING, PENNSYLVANIA.

MELTING-FURNACE.

No. 867,781.  Specification of Letters Patent.  Patented Oct. 8, 1907.

Application filed March 15, 1907. Serial No. 362,563.

*To all whom it may concern:*

Be it known that I, THOMAS D. BAUSHER, a citizen of the United States, residing at Reading, in the county of Berks and State of Pennsylvania, have invented certain new and useful Improvements in Melting-Furnaces, of which the following is a specification.

This invention relates to improvements in melting furnaces and the object is to provide a collapsible or "knock down" furnace for melting lead or other soft metals.

The device is intended more particularly for out door use.

The furnace comprises four vertical walls capable of being secured together at their meeting edges, to form a rectangular body and having means for suspending a metal holding pot therein, as well as means for regulating the draft therein. The furnace is especially adapted for use where prepared fuel is to be used.

The invention is more fully described in the following specification and clearly illustrated in the accompanying drawing, in which:—

Figure 1 is a vertical sectional view of my furnace. Fig. 2 is a plan view thereof. Fig. 3 shows one of the wall sections in detail.

The numeral 1 designates the wall of the furnace. This wall comprises four members each of which is formed with hinge members 2 at both its vertical edges adapted to interlock with the hinge members of the other wall members. A pin 3 passes through these hinges and locks the walls together, thus forming a rectangular body.

The numeral 4 designates the floor of the furnace. This floor rests loosely on rests or supports 5 secured to the inside of the wall members. Each of the wall members is provided with a door 6 immediately above the line of the floor. The upper edges of two of the wall members are formed with depressions 7 in which rests a removable supporting rod 8 on which is suspended a melting pot 9. In two opposite wall members I form a horizontal slot 10 and in each of these slots I locate a sliding damper 11. These dampers are concaved on their inner edges to approximately the outline of the surface of the melting pot, and with suitable handles 12 at their outer ends. These dampers slide on supports 13 secured to the wall members.

The fuel is placed on the floor 4 and ignited and the dampers are drawn out sufficiently to permit a draft of air between their ends and the surface of the pot 9. This draft is regulated by the opening or closing of the doors 6 and the lateral movement of the dampers. It will be seen that the hot air will pass upward around the pot and that the application of heat will be uniformly distributed as well as confined to the point at which it exerts its greatest efficiency.

The pot may be easily removed when the metal is melted.

The entire furnace may be taken apart when not in use or for shipment, by merely withdrawing the pins 3, removing the floor and withdrawing the dampers.

Having thus fully described my invention, what I claim and desire to secure by Letters Patent is:—

In a knock down melting furnace, a rectangular body comprising four vertical walls each of which is formed with interlocking hinge members, pins for securing together said members, a removable floor, a door in each of said wall members in line with said floor, two oppositely disposed, horizontally sliding dampers, said dampers having their inner edges concaved and provided with handles at their outer ends, a movable supporting rod and a melting pot supported by said rod and depending below the line of said dampers.

In testimony whereof I affix my signature, in presence of two witnesses.

THOMAS D. BAUSHER.

Witnesses:
CAMERON E. STRAUSS,
C. H. SCHAEFFER.